US010013375B2

(12) United States Patent
Kim et al.

(10) Patent No.: US 10,013,375 B2
(45) Date of Patent: Jul. 3, 2018

(54) SYSTEM-ON-CHIP INCLUDING ASYNCHRONOUS INTERFACE AND DRIVING METHOD THEREOF

(71) Applicant: SAMSUNG ELECTRONICS CO., LTD., Suwon-si, Gyeonggi-Do (KR)

(72) Inventors: Woo-Jin Kim, Yongin-si (KR); Nak-Hee Seong, Hwasung (KR); Hee-Seong Lee, Siheung-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 436 days.

(21) Appl. No.: 14/611,306

(22) Filed: Feb. 2, 2015

(65) Prior Publication Data
US 2016/0034409 A1 Feb. 4, 2016

(30) Foreign Application Priority Data

Aug. 4, 2014 (KR) .................. 10-2014-0099804
Sep. 29, 2014 (KR) .................. 10-2014-0130493

(51) Int. Cl.
| | | |
|---|---|---|
| *H05K 7/10* | (2006.01) | |
| *G06F 13/364* | (2006.01) | |
| *G06F 13/42* | (2006.01) | |
| *G06F 13/40* | (2006.01) | |

(52) U.S. Cl.
CPC .......... *G06F 13/364* (2013.01); *G06F 13/404* (2013.01); *G06F 13/409* (2013.01); *G06F 13/4226* (2013.01); *G06F 13/4282* (2013.01)

(58) Field of Classification Search
USPC .................. 710/300–308; 711/154–156
See application file for complete search history.

(56) References Cited

U.S. PATENT DOCUMENTS

| | | | |
|---|---|---|---|
| 5,598,445 A | 1/1997 | Pinto et al. | |
| 6,944,248 B2 | 9/2005 | Sullivan | |
| 5,977,897 A1 | 12/2005 | Nelson et al. | |
| 7,310,396 B1 | 12/2007 | Sabih | |
| 7,536,662 B2 * | 5/2009 | Sarwary | G06F 17/5022 716/106 |
| 7,787,580 B2 | 8/2010 | Metcal | |
| 8,131,967 B2 * | 3/2012 | Lemke | G06F 13/4059 710/52 |
| 8,301,932 B2 | 10/2012 | Hay et al. | |
| 9,432,298 B1 * | 8/2016 | Smith | H04L 49/9057 |
| 9,478,272 B1 * | 10/2016 | Grenier | G11C 7/1075 |
| 9,489,009 B2 * | 11/2016 | Lee | G06F 1/12 |
| 9,497,050 B2 * | 11/2016 | Kain | G06F 5/06 |
| 2003/0088724 A1 * | 5/2003 | Itoh | G06F 13/24 710/262 |
| 2006/0222126 A1 | 10/2006 | Edwards et al. | |

(Continued)

*Primary Examiner* — Raymond Phan
(74) *Attorney, Agent, or Firm* — Volentine, Whitt & Francos, PLLC

(57) ABSTRACT

A system-on-chip (SoC) may include a master, a slave, and an asynchronous interface having a first first-in first-out (FIFO) memory connected to the master and the slave. A write operation of the FIFO memory is controlled based upon a comparison of a write pointer and an expected write pointer of the FIFO memory, and a read operation of the FIFO memory is controlled based upon a comparison of a read pointer and an expected read pointer of the FIFO.

18 Claims, 7 Drawing Sheets

Same clock domain

Same clock domain

(56) References Cited

U.S. PATENT DOCUMENTS

| | | | |
|---|---|---|---|
| 2008/0195774 A1* | 8/2008 | Lemke | G06F 13/4059 710/57 |
| 2011/0204932 A1* | 8/2011 | Cortadella | G06F 7/00 327/145 |
| 2013/0205160 A1* | 8/2013 | Turner | G06F 5/12 713/400 |
| 2014/0376569 A1* | 12/2014 | Philip | G06F 1/04 370/503 |
| 2015/0236870 A1 | 8/2015 | Lee et al. | |

\* cited by examiner

SYSTEM-ON-CHIP INCLUDING ASYNCHRONOUS INTERFACE AND DRIVING METHOD THEREOF

CROSS-REFERENCE TO RELATED PATENT APPLICATION

This application claims priority under 35 U.S.C. § 119 to Korean Patent Application No. 10-2014-0099804 filed on Aug. 4, 2014 and Korean Patent Application No. 10-2014-0130493 filed on Sep. 29, 2014 in the Korean Intellectual Property Office, the disclosures of which are incorporated by reference herein in their entirety.

TECHNICAL FIELD

The present inventive concept relates to a system on chip (SoC), and more particularly, to data transfer control in an asynchronous interface in an SoC and a method of operating the same.

DISCUSSION OF THE RELATED ART

A system on chip (SoC) may integrate various and complex systems on a single chip. For example, as components of a computer, telecommunication devices, broadcasting devices, etc. are converged, an Application Specific Integrated Circuit (ASIC) or an Application Specific Standard Product (ASSP) may be more likely to be implemented by an SoC. Moreover, compact and light mobile device drivers are being developed in SoC related industries.

An SoC may include a plurality of intellectual properties (hereafter referred to as IPs or function blocks). Each of a plurality of function blocks may perform their own operations. The plurality of function blocks may communicate with each other through a bus in the SoC. For example, the Advanced Microcontroller Bus Architecture (AMBA) bus protocol may be used to connect the plurality of function blocks or IPs through an AMBA bus. AMBA defines several types of bus layers (or protocols), for example, Advanced High Performance Bus (AHB), Advanced Peripheral Bus (APB), Advanced eXtensible Interface (AXI), etc. The AXI bus protocol provides multiple outstanding addressing and data interleaving.

The plurality of function blocks can communicate with each other in a different clock domain or the same clock domain. When the function blocks operate in the same clock domain, they can receive and transmit data synchronously. On the other hand, when they operate in difference clock domains, the function blocks may have additional circuits to receive and transmit data asynchronously.

A long distance between a transmitter and a receiver may result in a long transmission line connected between the transmitter and the receiver. In this case, if the transmitter and the receiver operate in different clock domains, an output signal of a First In First Out (FIFO) memory in the transmitter is lengthened when sent to the receiver for an asynchronous interface to transmit data. A clock signal of the receiver is also lengthened when sent to the transmitter for controlling the FIFO memory in the transmitter. The output signal of the FIFO memory is synchronized with a clock signal in the transmitter to store data in the FIFO memory. However, propagation delays in the output signal of FIFO memory and the clock signal of the receiver which are lengthened may limit the maximum data transfer speed between the transmitter and the receiver.

The transmitter or the receiver may include a FIFO to transmit data. The FIFO may be controlled by a read pointer and a write pointer. However, the long transmission line between the transmitter and the receiver may result in uncertainty of data arrival time such that the data transfer between the transmitter and the receiver may not be secured.

SUMMARY

According to an exemplary embodiment of the present inventive concept, a system-on-chip (SoC) may include a master, a slave, and an asynchronous interface having a first first-in first-out (FIFO) memory connected to the master and the slave, wherein a write operation of the FIFO memory is controlled based upon a comparison of a write pointer and an expected write pointer of the FIFO memory, and a read operation of the FIFO memory is controlled based upon a comparison of a read pointer and an expected read pointer of the FIFO memory.

The FIFO memory may comprise a first FIFO and a second FIFO, and the asynchronous interface may comprise a slave interface and a master interface, wherein the slave interface comprises a slave transmitter, a slave clock domain crossing (CDC) block having the first FIFO and a slave receiver, the master interface comprises a master transmitter, a master clock domain crossing (CDC) block having a second FIFO connected to the master and the slave, and a master receiver.

The synchronous interface may generate a write enable signal to control a write operation of the FIFO based on the comparison result of the write pointer and the expected write pointer. The FIFO may store data at an address pointed by the write pointer when the write enable signal is activated. The asynchronous interface may generate a read enable signal to control a read operation of the FIFO based on the comparing result of the read pointer and the expected read pointer. The FIFO may transmit data stored at an address pointed by the read pointer to the master receiver or the slave receiver when the read enable signal is activated.

The asynchronous interface may compensate an interval between the read pointer and the write pointer constant. The expected read pointer may be calculated based on the write pointer and the interval, and the expected write pointer may be calculated based on the read pointer and the interval. The asynchronous interface may transmit data to the FIFO in synchronization with a gated clock generated based on a master operation clock and a slave operation clock.

A period of compensating the interval for the read operation of the FIFO may be determined by a most significant bit (MSB) of the write pointer and a period of compensating the interval for the write operation of the FIFO may be determined by a most significant bit (MSB) of the write pointer.

According to an exemplary embodiment of the present inventive concept, a method of operating a system-on-chip may include calculating an expected write pointer based on a write pointer and a predefined interval between the write pointer and a read pointer of a FIFO in an asynchronous interface, comparing the expected write pointer and the write pointer, and controlling a write operation of the FIFO based on the comparing result.

The FIFO may include a first FIFO and a second FIFO, and the asynchronous interface comprises a slave interface and a master interface, wherein the slave interface comprises a slave transmitter, a slave clock domain crossing (CDC) block having the first FIFO and a slave receiver, the master interface comprises a master transmitter, a master clock domain crossing (CDC) block having a second FIFO connected to the master and the slave, and a master receiver.

The method of operating a system-on-chip may further include calculating an expected read pointer based on the read pointer and a predefined interval between the write pointer and the read pointer of the FIFO in the asynchronous interface, comparing the expected read pointer and the read pointer and controlling a read operation of the FIFO based on the comparing result.

The controlling of the write operation of the FIFO may include generating a write enable signal to control the write operation of the FIFO based on the comparing result of the write pointer and the expected write pointer and storing data at an address pointed by the write pointer when the write enable signal is activated.

The controlling of the read operation of the FIFO may include generating a read enable signal to control the read operation of the FIFO based on the comparing result of the write pointer and the expected write pointer and transmitting data stored at an address pointed by the write pointer to the master receiver or the slave receiver when the read enable signal is activated.

According to an exemplary embodiment of the present inventive concept, a computer system may include a memory device and a system-on-chip including a master, a slave and an asynchronous interface having a first first-in first-out (FIFO) connected to the master and the slave, wherein the SoC is configured to control a write operation of the FIFO by comparing a write pointer and a expected write pointer of the FIFO and control a read operation of the FIFO by comparing a read pointer and a expected read pointer of the FIFO.

The FIFO may include a first FIFO and a second FIFO, and the asynchronous interface comprises a slave interface and a master interface, wherein the slave interface comprises a slave transmitter, a slave clock domain crossing (CDC) block having the first FIFO and a slave receiver, the master interface comprises a master transmitter, a master clock domain crossing (CDC) block having a second FIFO connected to the master and the slave, and a master receiver.

The asynchronous interface may generate a write enable signal to control the write operation of the FIFO based on the comparison result of the write pointer and the expected write pointer, and stores data at an address pointed by the write pointer when the write enable signal is activated.

The asynchronous interface may generate a read enable signal to control the read operation of the FIFO based on the comparing result of the write pointer and the expected write pointer, and transmits data stored at an address pointed by the write pointer to the master receiver or the slave receiver when the read enable signal is activated.

The asynchronous interface may transmit data to the FIFO in synchronization with a gated clock generated based on a master operation clock and a slave operation clock.

According to an exemplary embodiment of the present inventive concept, a method of operating a system-on-chip including a master device, a slave device and an asynchronous interface therebetween, may include calculating an expected write pointer based on a write pointer and a predefined interval between the write pointer and a read pointer of a FIFO memory in the asynchronous interface, comparing the expected write pointer and the write pointer, controlling a write operation of the FIFO memory based on the comparison result, calculating an expected read pointer based on the read pointer and a predefined interval between the write pointer and the read pointer of the FIFO memory in the asynchronous interface, comparing the expected read pointer and the read pointer, and controlling a read operation of the FIFO memory based on the comparison result.

The controlling a write operation of the FIFO memory may include generating a write enable signal to control the write operation of the FIFO based on the comparison result of the write pointer and the expected write pointer, and storing data at an address pointed by the write pointer when the write enable signal is activated.

The controlling a read operation of the FIFO may include generating a read enable signal to control the read operation of the FIFO based on the comparison result of the write pointer and the expected write pointer, and transmitting data stored at an address pointed by the write pointer to the master receiver or the slave receiver when the read enable signal is activated.

The method of operating a system-on-chip may further include keeping an interval between the read pointer and the write pointer constant, and wherein the expected read pointer is calculated based on the write pointer and the interval, and the expected write pointer is calculated based on the read pointer and the interval.

A period of compensating an interval for the read operation of the FIFO memory is determined by a most significant bit (MSB) of the write pointer, and a period of compensating an interval for the write operation of the FIFO memory is determined by a most significant bit (MSB) of the write pointer.

BRIEF DESCRIPTION OF THE DRAWINGS

The above and other features of the present inventive concept will become more apparent by describing in detail exemplary embodiments thereof with reference to the accompanying drawings in which.

DETAILED DESCRIPTION OF THE EMBODIMENTS

Various exemplary embodiments of the present inventive concept will be described more fully hereinafter with reference to the accompanying drawings. The present inventive concept may, however, be embodied in many different forms and should not be construed as being limited to the embodiments set forth herein. In the drawings, the sizes and relative sizes of layers and areas may be exaggerated for clarity. Like numerals may refer to like elements throughout the specification and drawings.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
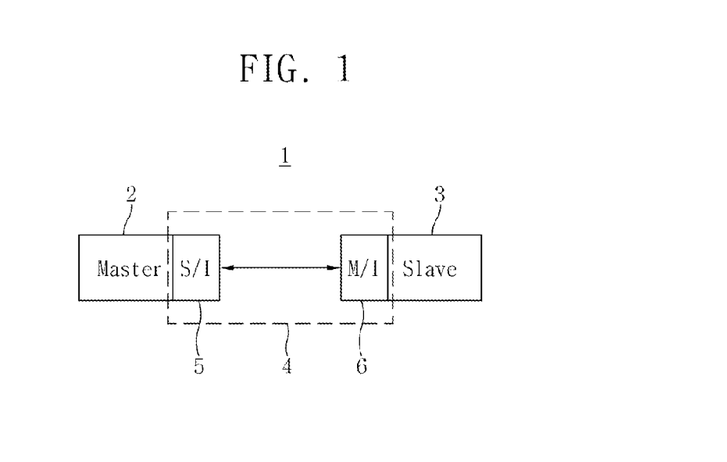
FIG. 1 is a block diagram of a system on chip (SoC) according to an exemplary embodiment of the present inventive concept.

FIG. 1 is a block diagram of a system on chip (SoC) according to an exemplary embodiment of the present inventive concept. Referring to FIG. 1, an SoC 1 includes a master 2, a slave 3 and an asynchronous interface 4 connected between the master 2 and the slave 3. According to an exemplary embodiment, the master 2 may include one of a central processing unit (CPU), a direct memory access unit (DMA) and a 3-dimensional graphic accelerator, for example. The slave 3 may include a main bus 20.

The asynchronous interface 4 may include a slave interface 5 and a master interface 6. The slave interface 5 and the master interface 6 will be described in detail in FIGS. 2 and 3. The asynchronous interface 4 may be used when clock domains are different. For example, the master 2 may be synchronized with a master clock and the slave 3 may be synchronized with a slave clock. The asynchronous interface 4 may be connected between the master 2 and the slave 3.

The SoC 1 may have a long routing path between the master 2 and the slave 3 so that the effective asynchronous interface is significant in the SoC 1. The technique of effective asynchronous interface is described in U.S. patent application Ser. No. 14/486,434 filed on Sep. 15, 2014, the disclosure of which is hereby incorporated by reference.

The asynchronous interface 4 may include a first-in first-out (FIFO) memory (hereafter FIFO) to connect the master 2 and the slave 3. The FIFO may include a read pointer and a write pointer. When the read pointer and the write pointer doesn't have an appropriate interval, the FIFO may have a full state or an empty state so that the data transfer may be broken between the master 2 and the slave 3.

According to the exemplary embodiment of the present inventive concepts, an SoC 1 may keep an interval between the write pointer and the read pointer of the FIFO. The method of controlling an interval between the write pointer and the read pointer will be described in detail in FIG. 3.

Figure 2:
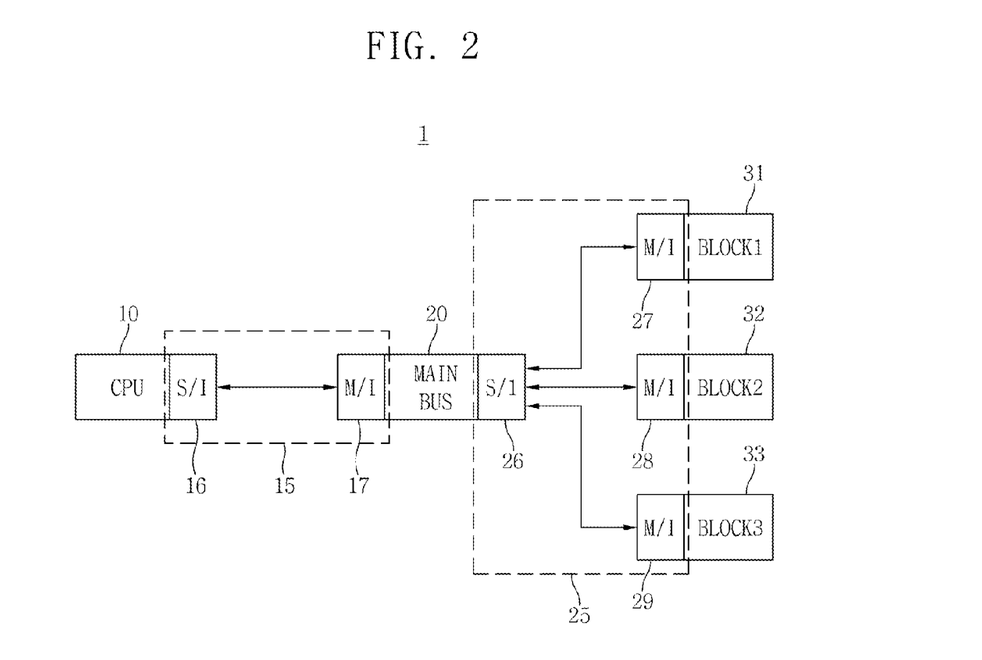
FIG. 2 is a block diagram of a system on chip (SoC) according to another exemplary embodiment of the present inventive concept.

FIG. 2 is a block diagram of a system on chip (SoC) according to another exemplary embodiment of the present inventive concept. Referring to FIG. 2, an SoC 1 may include a CPU 10, a main bus 20, and a plurality of function blocks 31 to 33. For example, the SoC 1 may be embodied in a mobile device or a wearable device. The SoC 1 may further include a first asynchronous interface 15 connected between the CPU 1 and the main bus 20, and a second asynchronous interface 25 connected between the main bus 20 and the plurality of function blocks 31 to 33.

The first asynchronous interface 15 may include a first slave interface 16 and a first master interface 17. The second asynchronous interface 25 may include a second slave interface 26 and a second to fourth master interfaces 27 to 29. An operation of the slave interfaces 16 and 26 and the master interfaces 17 and 27 to 29 will be described in detail in FIGS. 3, 4A and 4B.

Each of the first and second asynchronous interfaces 15 and 25 may operate in different clock domains. For example, the CPU 10 may operate in synchronization with a CPU clock. The main bus 20 may operate in synchronization with a bus clock. The first asynchronous interface 15 may connect the CPU 10 and the main bus 20. Likewise, each of the first to third function blocks 31 to 33 may operate in different clock domains. The second asynchronous interface 25 may connect the main bus 20 and the first to third function blocks 31-33.

The CPU 10 may access the first to third function blocks 31 to 33 through the main bus 20. For example, the CPU 10 may receive data from the first function block 31 through the main bus 20 and may transmit data to the second function block 32 through the main bus 20. Likewise, the CPU 10 may receive and transmit data from/to the third function block 33 through the main bus 20.

According to an exemplary embodiment, the CPU 10 may include ARM processor and the first to third function block 31 to 33 may include a memory device. When the CPU 10 and the main bus 20 operate in different clock domains, the first asynchronous interface 15 may include a FIFO to store data. In addition, when the main bus 20 and the first function block 31 may operate in different clock domains, the second asynchronous interface 25 may include a FIFO to store data.

If a FIFO in an asynchronous interface has a full state or an empty state, a performance of the SoC 1 may be reduced. Thus, the SoC 1 may control to avoid the full state or the empty state. According to the exemplary embodiment of the inventive concept, the SoC 1 may compensate a write pointer and a read pointer to keep an interval between the write pointer and the read pointer of the FIFO. The method of controlling an interval between the write pointer and the read pointer will be described in detail in FIGS. 4A and 4B.

Figure 3:
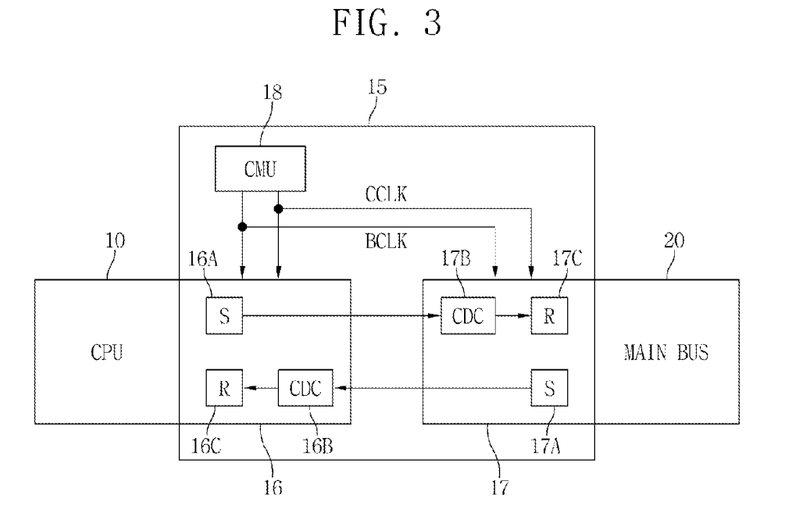
FIG. 3 is a block diagram illustrating an asynchronous interface in the system on chip (SoC) shown in FIG. 2.

FIG. 3 is a block diagram illustrating an asynchronous interface in the system on chip (SoC) shown in FIG. 2. Referring to FIGS. 2 and 3, FIG. 3 illustrates the CPU 10, the first asynchronous interface and a main bus 20. According to an exemplary embodiment of the present inventive concept, the first asynchronous interface 15 may include a slave interface 16, a master interface 17 and a clock management unit 18.

The slave interface 16 may include a slave transmitter 16A, a slave clock domain crossing (CDC) block 16B and a slave receiver 16C. The master interface 17 may include a master transmitter 17A, a master clock domain crossing (CDC) block 17B, and a master receiver 17C. The slave interface 16 and the master interface 17 may include the same structure and perform the same function.

The CPU 10 may transmit data to the main bus 20 through the slave interface 16 and the master interface 17. In detail, the slave transmitter 16A may transmit data to the master receiver 17C through the master CDC block 17B. The master CDC clock 17B may include a FIFO to store data received from the slave transmitter 16A. A write operation which transmits data from the CPU 10 to the main bus 20 will be described in detail in FIG. 4A.

In addition, the main bus 20 may transmit data to the CPU 10 through the slave interface 16 and the master interface 17. In detail, a master transmitter 17A may transmit data to the slave receiver 17A through the slave CDC block 16B. A read operation which transmits data from the main bus 20 to the CPU 10 will be described in detail in FIG. 4B. The clock management unit 18 may transmit a CPU clock CCLK which is an operating clock of the CPU 10 and a bus clock BCLK which is an operating clock of the main bus 20 to the slave interface 16 and the master interface 17.

The CPU 10 and the main bus 20 in FIG. 3 is just an example of a first intellectual property (IP) and a second IP, but not limited thereto. The first IP and the second IP may be other IPs and an interface connected to the first IP or the second IP may operate as a master interface or a slave interface according to the role of the first IP or the second IP. For example, when the first IP operates as a slave, the slave interface 16 may operate as a master interface and when the second IP operates as a master, the master interface 17 may operate as a slave interface.

Figure 4A:
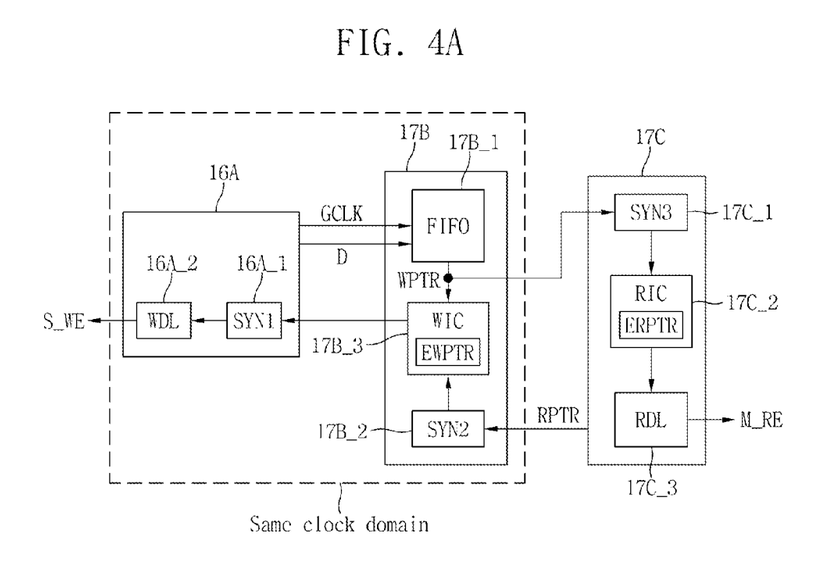
FIGS. 4A and 4B are block diagrams illustrating data transfers between a master and a slave in detail according to an exemplary embodiment of the present inventive concept.
Figure 4B:
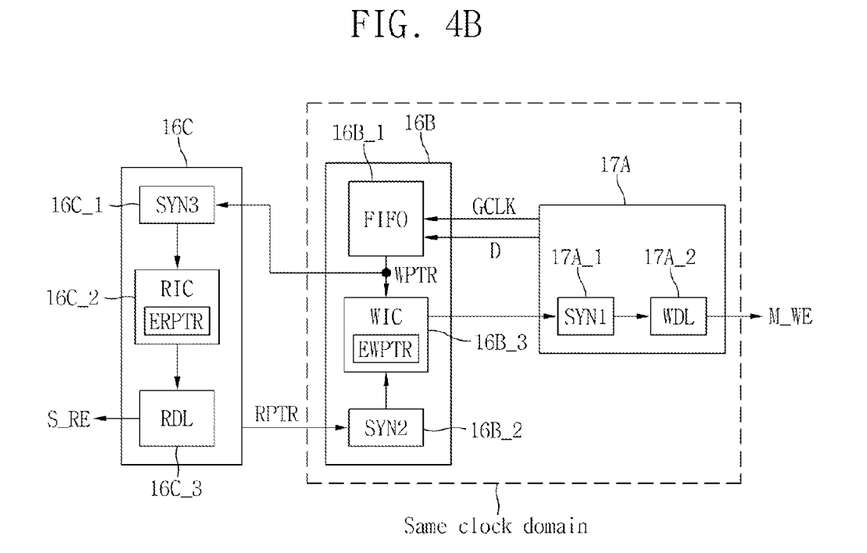

FIGS. 4A and 4B are block diagrams illustrating data transmission between a master and a slave in detail according to an exemplary embodiment of the present inventive concept. FIG. 4A illustrates a write operation from the CPU 10 to the main bus 20. FIG. 4B illustrates a data read operation from the main bus 20 to the CPU 10.

Referring to FIGS. 3 and 4A, the asynchronous interface 15 may include a slave transmitter 16A, a master CDC block 17B and a master receiver 17C. The slave transmitter 16A and the master CDC block 17B may operate in the same clock domain. The master receiver 17C may operate in a different clock domain from the clock domain of the slave transmitter 16A and the master CDC block 17B. In other words, a read operation and a write operation of the master FIFO 17B_1 may be performed in different clock domains. For example, the CPU 10 may be synchronized with a CPU clock CCLK and the main bus 20 may be synchronized with a bus clock BCLK.

If the CPU clock CCLK is faster than the bus clock BCLK, the slave transmitter 16A may transmit data to the master FIFO 17B_1 in synchronization with a gated clock GCLK which is a clock adjusted according to a clock speed ratio of the CPU clock CCLK and the bus clock BCLK. In other words, by referring to a clock speed ratio between asynchronous clocks in different clock domains, a gated clock may be generated to keep the transfer speed of read data and write data between the different clock domains substantially equal. The method of generating the gated clock GCLK will be described in FIG. 5.

The slave transmitter 16A may include a first slave synchronizer 16A_1 and slave write disable logic 16A_2. The first slave synchronizer 16A_1 may perform a buffer function to secure safe data transmit. The slave write disable logic 16A_2 may disable a slave write enable signal S_WE.

The master CDC block 17B may include a master FIFO 17B_1, a second master synchronizer 17B_2 and a master write interval checker 17B_3. The master FIFO 17B_1 may store received data D from the slave transmitter 16A in synchronization with the gated clock GCLK. For example, the master FIFO 17B_1 may store data which will be stored in a memory through the main bus 20 for a write operation of the CPU 10. The master FIFO 17B_1 may include a write pointer WPTR which points an address for storing data in the master FIFO 17B_1 and a read pointer RPTR which points an address for reading data from the master FIFO 17B_1. In other words, the master FIFO 17B-1 may store data for a write operation of the CPU 10 according to the write pointer WPTR and may transmit the stored data through the master receiver 17C for a read operation of the main bus 20 according to the read pointer RPTR. The write pointer WPTR and the read pointer RPTR of the master FIFO 17B_1 will be described in detail in FIG. 6.

The second master synchronizer 17B_2 may have a depth to securely receive a current read pointer RPTR from the master receiver 17C. A depth of a synchronizer may be a defined clock cycle to transmit a received data in synchronization without error.

The master write interval checker 17B_3 may generate an expected write pointer EWPTR. According to an exemplary embodiment of the present inventive concept, the master write interval checker 17B_3 may generate the expected write pointer EWPTR according to Formula 1. The master write interval checker 17B_3 may compare the current write pointer WPTR and the expected write pointer EWPTR, and may transmit the comparison result to the slave write disable logic 16A_2 through the first slave synchronizer 16A_1.

The slave write disable logic 16A_2 may disable a slave write enable signal S_WE in response to the comparison result. When the current write pointer WPTR is smaller than the expected write pointer EWPTR, the slave write enable signal S_WE may be disabled for a clock cycle. For example, the current write pointer WPTR is 3'b011 and the expected write pointer is 3'b010, the slave write disable logic 16A_2 may disable the slave write enable signal S_WE for one clock cycle in response to the comparison result. The slave write enable signal S_WE will be described in detail in FIG. 7.

The read pointer RPTR may be an address to data D from the master FIFO 17B_1. The expected read pointer ERPTR may be calculated by the master CDC block 17B in a different clock domain by transmitting the current read pointer RPTR through the second synchronizer 17B_2. When a signal is transmitted between different clock domains, the signal arriving timing may not be fixed due to changes of clock duration due to PLL jitters in each of the different clock domains or signal delay to synchronize the signal between the different clock domains. For example, a real read pointer of the master FIFO 17B_1 in real time may be different from the received read pointer RPTR. To address the problem caused by the timing gap between the real read pointer and the received read pointer RPTR in different clock domains, the expected read pointer ERPTR may be used instead of the read pointer RPTR.

The master write interval checker 17B_3 may calculate the expected write pointer EWPTR based on the current read pointer RPTR and an interval between a write pointer and a read pointer of the master FIFO 17B_1. The interval may be a predefined value before transmitting data and an address gap between the write pointer and the read pointer of the master FIFO 17B_1. In other words, the expected write pointer EWPTR may be a target write pointer and be expressed by an arithmetic equation Formula 1. Referring to Formula 1, a synchronized read pointer may be securely generated by adding the current read pointer and the depth of the second master synchronizer 17B_2, and the expected write pointer EWPTR may be generated as the target write pointer by adding the synchronized read pointer and the predefined interval. For example, when the depth of the second master synchronizer 17B_2 is three and the interval is two and the current read pointer RPTR is four, the expected write pointer EWPTR may be ten. In case of a write pointer having 3-bit width at maximum, the expected write pointer EWPTR may be two by truncation according to a round robin access.

Expected write pointer EWPTR=Current read pointer+Depth of the second master synchronizer 17B_2+interval.   Formula 1

The master receiver 17C may include a third master synchronizer 17C_1, a master read interval checker 17C_2 and a master read disable logic 17C_3. The third master synchronizer 17C_1 may have a depth to securely receive the current write pointer WPTR.

The master read interval check 17C_2 may generate an expected read pointer ERPTR. According to an exemplary embodiment of the present inventive concept, the master read interval check 17C_2 may generate the expected read pointer ERPTR according to Formula 2. Referring to Formula 2, a synchronized write pointer may be securely generated by adding the current write pointer and the depth of the third master synchronizer 17C_1, and the expected read pointer ERPTR may be generated as the target read pointer by subtracting the predefined interval from the synchronized write pointer. The master read interval check 17C_2 may compare the current read pointer RPTR and the expected read pointer ERPTR, and may transmit the comparing result to the master read disable logic 17C_3.

The master read disable logic 17C_3 may disable a master read enable signal M_RE in response to the comparing result. When the current read pointer RPTR is greater than the expected read pointer, the master read enable signal M_RE may be disabled for a clock cycle. For example, the current read pointer RPTR is 3'b001 and the expected read pointer is 3'b000, the master read disable logic 17C_3 may disable the master read enable signal M_RE for one clock cycle in response to the comparison result. The master read enable signal M_RE will be described in detail in FIG. 8.

The master read interval checker 17C_2 may calculate the expected read pointer ERPTR based on the current write pointer WPTR and the interval between the write pointer and the read pointer of the master FIFO 17B_1. The expected read pointer ERPTR may be expressed by an arithmetic equation Formula 2. In other words, when depth of the third master synchronizer 17C_1 is three, the interval is three and the current write pointer WPTR is four, the expected read pointer ERPTR may be 4.

Expected read pointer ERPTR=Current write pointer+Depth of the third master synchronizer 17C_1−Interval.   Formula 2

Referring to FIGS. 3 and 4B, FIG. 4B illustrates a read operation by a master IP such as CPU 10. The asynchronous interface 15 may include a slave CDC block 16B, a slave receiver 16C and a master transmitter 17A. The structures and the operations of the slave CDC block 16B, the slave receiver 16C and the master transmitter 17A are substantially the same as the structures and the operations of the slave transmitter 16A, the master CDC block 17B and the master receiver 17C as described in FIGS. 3 and 4A although the direction of the data transfer between the CPU 10 and the main bus 20 through the asynchronous interface 15 is different between FIGS. 4A and 4B.

The master transmitter 17A and the slave CDC block 16B operate in the same clock domain although the distance between the master transmitter 17A and the slave CDC block 16B may be very long in an SoC. On the other hand, a read operation and a write operation of the slave FIFO 16B_1 may be performed in different clock domains. For example, the CPU 10 may be synchronized with the CPU clock CCLK and the main bus 20 may be synchronized with the bus clock BCLK.

If the CPU clock CCLK is faster than the bus clock BCLK, the master transmitter 17A may transmit data to the slave FIFO 16B_1 in synchronization with a gated clock GCLK which is a clock adjusted according to a clock speed ratio of the CPU clock CCLK and the bus clock BCLK. In other words, by referring to a clock speed ratio between asynchronous clocks in different clock domains, a gated clock may be generated to keep the transfer speed of read data and write data between the different clock domains substantially equal. The method of generating the gated clock GCLK will be described in FIG. 5.

The master transmitter 17A may include a first master synchronizer 17A_1 and a master write disable logic 17A_2. The first master synchronizer 17A_1 may be at least one buffer to securely transfer data. The master write disable logic 17A_2 may disable the master write enable signal M_WE. The first master synchronizer 17A_1 and the master write disable logic 17A_2 may correspond to the first slave synchronizer 16A_1 and the slave write disable logic 16A_2 respectively such that a detailed description will be skipped.

The slave CDC block 16B may include a slave FIFO 16B_1, a second slave synchronizer 16B_2 and a slave write interval checker 16B_3. The slave FIFO 16B_1, the second slave synchronizer 16B_2 and the slave write interval checker 16B_3 may correspond to the master FIFO 17B_1, the second master synchronizer 17B_2 and the master write interval checker 17B_3 respectively such that a detailed description is not needed here.

The master receiver 16C may include a third master synchronizer 16C_1, a master read interval checker 16C_2 and a master read disable logic 16C_3. The master read disable logic 16C_3 may disable a slave read enable signal S_RE. The third master synchronizer 16C_1, the master read interval checker 16C_2 and the master read disable logic 16C_3 may correspond to the third synchronizer 17C_1, the master read interval checker 17C_2 and the master read disable logic 17C_3 respectively such that a detailed description is not needed here.

The asynchronous interface 15 may include a slave transmitter 16A, a master CDC block 17B, a master receiver 17C, a slave CDC block 16B, a slave receiver 16C and a master transmitter 17A for a read operation and a write operation between a master IP and a slave IP.

According to the exemplary embodiments illustrated in FIGS. 1 to 4B, the asynchronous interface 15 may keep the transfer speed of read data and write data between the different clock domains substantially equal or the amount of data of input and output of a FIFO substantially equal in real time in the SoC 1.

When data transfers between different clock domains, there may be various uncertainties in view of timing of the data transfer. The uncertainty may occur due to the asynchronization between the CPU clock CCLK and the bus clock BCLK or the buffer functions of the plurality of synchronizers 16A_1, 17B_2, 17C_1, 17A1, 16B_2 and 16C_1 to securely receive data. In addition, the uncertainty may occur due to an accumulated jitter of a PLL (Phase Locked Loop) which is used to generate the CPU clock CCLK or the bus clock BCLK. Thus, if the uncertainty is not compensated, the interval of the write pointer and the read pointer may vary such that the master FIFO 17B_1 and the slave FIFO 16B_1 may fall into a full state or an empty state which may cause an overrun or an underrun of the FIFOs 17B_1 and 16B_1.

To reduce this uncertainty, the SoC 1 may determine periodically whether to compensate the interval between the write pointers WPTRs and the read pointers RPTRs of the master FIFO 17B_1 and the slave FIFO 16B_1 by checking the intervals. For example, when the depth of the master FIFO 17B_1 or the slave FIFO 16B_1 is eight, the check period may be 8, 16, 24, or 32 clock cycles. A method of compensating an interval between the write pointer WPTR and the read pointer RPTR may include disabling the write enable signal WE (M_WE or S_WE) and the read enable signal RE (M_RE or S_RE) to keep an initial interval between the write pointer WPTR and the read pointer RPTR.

A period to compensate the write pointer WPTR may be determined by a most significant bit MSB of the write pointer WPTR or the read pointer RPTR. For example, if a width of the write pointer WPTR or the read pointer RPTR is 3-bit, a period of the rising edge of the MSB of the write pointer WPTR or the read pointer RPTR may be eight clock cycles. Thus, if the period of the compensation is determined by the MSB of the write pointer WPTR or the read pointer RPTR, the compensation period of the write pointer WPTR may be eight clock cycles. Likewise, a period to compensate the read pointer RPTR may be determined by the most significant bit MSB of the write pointer WPTR or the read pointer RPTR. When the compensation is necessary, based on the clock ratio of different clock domains, the SoC 1 may disable at least one of the master write enable signal M_WE, the slave read enable signal S_RE, the slave write enable signal S_WE and the master read enable signal M_RE.

The farther the distance of data transmission line between the slave interface 5 and the master interface 6 is, the more time the compensation of the interval may require. Thus, the period and the policy of the compensation of the interval may be determined based on the distance of data transmission line. For example, a first policy may be performing compensation when the difference between a expected point and a current pointer is one. A second policy may be performing compensation when the difference between a expected point and a current pointer is two. A third policy may perform compensation when a case that the difference between an expected point and a current pointer is one occurs two times in a row or that the difference between an expected point and a current pointer is three.

Figure 5:
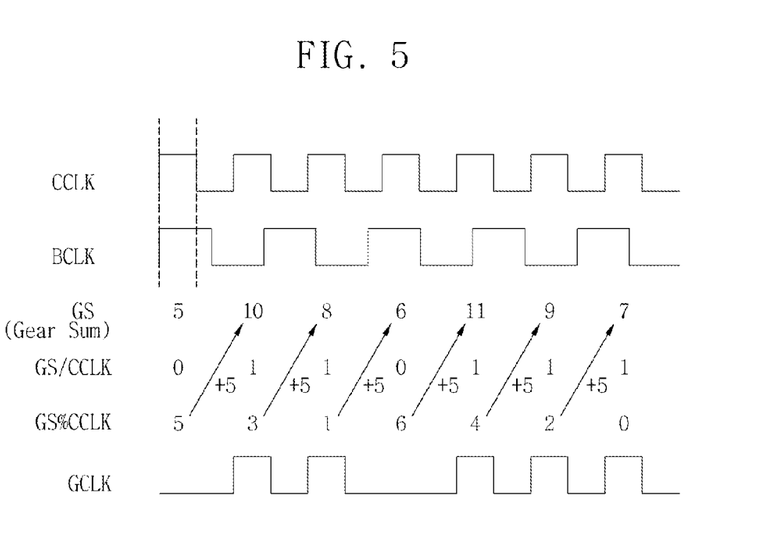
FIG. 5 is a timing diagram of a plurality of clocks and a gated clock according to the plurality of clocks shown in FIG. 3.

FIG. 5 is a timing diagram of a plurality of clocks and a gated clock according to the plurality of clocks shown in FIG. 3. FIG. 5 illustrates a timing diagram of the CPU clock CCLK, the bus clock BCLK and a gated clock GCLK generated based on the CPU clock CCLK and the bus clock BCLK. Referring to FIGS. 3 and 5, the slave transmitter 16A and the master CDC block 17B may operate in the same clock domain. On the other hand, the master CDC block 17B and the master receiver 17C may operate in different clock domains.

The slave transmitter 16A and the master CDC block 17B may be synchronized with the CPU clock CCLK. For example, when the slave transmitter 16A transmits data to the master CDC block 17B, the CPU clock CCLK along with the data may transmit to the master CDC block 17B. In addition, the master transmitter 17A may transmit the bus clock BCLK to the slave CDC block 16B.

On the other hand, when the CPU 10 is synchronized with the CPU clock CCLK and the main bus is synchronized with the bus clock BCLK, the master CDC block 17B may operate in synchronization with the gated clock GCLK. In this case, the CPU clock CCLK may be faster than the bus clock BCLK. For example, when the CPU clock CCLK toggles seven times, the bus clock BCLK may toggle five times. Since the speeds of the CPU clock CCLK and the bus clock BCLK are different, the CPU 10 may use the gated clock GCLK which has the similar toggling count to that of the main bus clock BCLK.

The gated clock may use a gear ratio of the CPU clock CCLK and the bus clock BCLK. The method of generating a gated clock may include toggling the gated clock GCLK whenever an accumulated slow clock gear ratio (e.g. five) goes over a fast clock gear ratio (e.g. seven). A pulse of the gated clock may be the same as the pulse of the fast clock as shown in FIG. 5. For example, the gear ratio of the CPU clock CCLK and the bus clock BCLK may be 7:5. A gear sum GS may be defined as the summation of a remainder of the gear sum GS (e.x., initially slow clock gear ratio, five) divided by the gear ratio of the CPU clock CCLK (e.x., fast clock gear ratio, seven) and the gear ratio of the bus clock BCLK (e.x., slow clock gear ratio, five). The gated clock GCLK may be generated by dividing the gear sum GS by the gear ratio of the CPU clock CCLK.

The method of generating a gated clock will be described in detail below. A first gear sum may be five as the gear ratio of the bus clock BCLK. The method of generating a gated clock may include dividing the first gear sum, e.x., five, by the gear ratio of the CPU clock CCLK, seven. Then, the quotient is zero and the remainder is five.

A second gear sum may be generated by adding the remainder, five and the gear ratio of the bus clock BCLK, five. Thus, the second gear sum is ten. The method of generating a gated clock may include dividing the second gear sum by the gear ratio of the CPU clock CCLK, seven. Then, the quotient is one and the remainder is three. Since the quotient is one, the gated clock may toggle for a cycle.

A third gear sum may be generated by adding the remainder, three and the gear ratio of the bus clock BCLK, five. Thus, the third gear sum is eight. The method of generating a gated clock may include dividing the third gear sum by the gear ratio of the CPU clock CCLK, seven. Then, the quotient is one and the remainder is one. Since the quotient is one, the gated clock may toggle for a cycle.

A fourth gear sum may be generated by adding the remainder, one and the gear ratio of the bus clock BCLK, five. Thus, the fourth gear sum is six. The method of generating a gated clock may include dividing the fourth gear sum by the gear ratio of the CPU clock CCLK, seven. Then, the quotient is zero and the remainder is six. Since the quotient is zero, the gated clock may not toggle.

A fifth gear sum may be generated by adding the remainder, six and the gear ratio of the bus clock BCLK, five. Thus, the fifth gear sum is eleven. The method of generating a gated clock may include dividing the fifth gear sum by the gear ratio of the CPU clock CCLK, seven. Then, the quotient is one and the remainder is four. Since the quotient is one, the gated clock may toggle for a cycle.

A sixth gear sum may be generated by adding the remainder, four and the gear ratio of the bus clock BCLK, five. Thus, the sixth gear sum is nine. The method of generating a gated clock may include dividing the sixth gear sum by the gear ratio of the CPU clock CCLK, seven. Then, the quotient is one and the remainder is two. Since the quotient is one, the gated clock may toggle for a cycle.

A seventh gear sum may be generated by adding the remainder, two and the gear ratio of the bus clock BCLK, five. Thus, the seventh gear sum is seven. The method of generating a gated clock may include dividing the seventh gear sum by the gear ratio of the CPU clock CCLK, seven. Then, the quotient is one and the remainder is zero. Since the quotient is one, the gated clock may toggle for a cycle.

When the remainder is zero, a gating period may be completed and may start again the same sequence. During the seven cycles of the CPU clock CCLK which is a faster clock, the total toggle count is the same as the total toggle count of the slow clock, the bus clock BCLK. As a result, a gated clock may have the same pulse as a fast clock and may have the same toggle count as the toggle count of a slow clock for a period in an asynchronous interface as shown in FIG. 5. However, if a gated clock GCLK is generated from a clock domain which has lower clock speed than the clock speed of the other clock domain in an asynchronous interface, the gated clock GCLK may have the same pulse as the pulse of the clock having the lower clock speed. In other words, the gated clock may be generated to have the same total gear ratio as the gear ratio of the slow clock for a data transfer period and to have the same pulse as the pulse of a transmitter clock.

Figure 6:
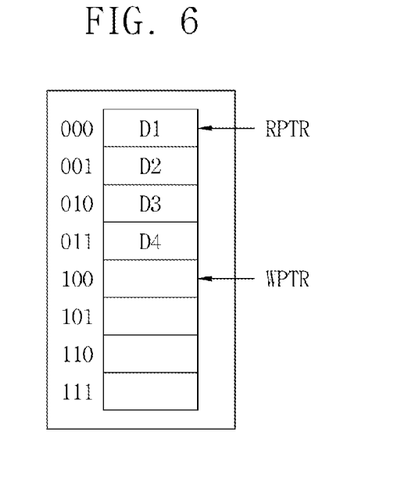
FIG. 6 is a block diagram illustrating a master FIFO and a slave FIFO shown in FIGS. 4A and 4B.

FIG. 6 is a block diagram illustrating a master FIFO and a slave FIFO shown in FIGS. 4A and 4B. Referring to FIGS. 4A, 4B and 6, the slave FIFO 16B_1 and the master FIFO 17B_1 may include a read pointer RPTR and a write pointer WPTR. In the slave FIFO 16B_1 and the master FIFO 17B_1, the write pointer WPTR may point an address to store data received from CPU 10 and the read pointer RPTR may point an address to read data.

When the data is stored, the WPTR may increase to point a next write address for a next write operation. When the data is read, the RPTR may increase to point a next read address for a next read operation. The slave FIFO 16B_1 or the master FIFO 17B_1 may store data up to a full state of the slave FIFO 16B_1 or the master FIFO 17B_1 respectively. On the other hand, the slave FIFO 16B_1 or the master FIFO 17B_1 may output data up to a full state of the slave FIFO 16B_1 or the master FIFO 17B_1 respectively. The read pointer RPTR or the write pointer WPTR may address the slave FIFO 16B_1 or the master FIFO 17B_1 successively by a round robin addressing method.

The slave FIFO 16B_1 or the master FIFO 17B_1 may store data received from the slave transmitter 16A. For example, if the main bus 20 is an Advanced eXtensible Interface AXI bus made by ARM, the AXI bus may include a write address channel, a write data channel, a write response channel, a read address channel and a read data channel. Each of the channels may transmit or receive data. The slave FIFO 16B_1 or the master FIFO 17B_1 may store a payload which is a group of data transmitted through each of the channels. For example, the CPU 10 and the main bus 20 may receive or transmit a payload from/to each other.

The slave FIFO 16B_1 or the master FIFO 17B_1 may store a first data D1 at address 3'b000. The slave FIFO 16B_1 or the master FIFO 17B_1 may store a second data D2 at address 3'b001. The slave FIFO 16B_1 or the master FIFO 17B_1 may store a third data D3 at address 3'b010. The slave FIFO 16B_1 or the master FIFO 17B_1 may store a fourth data D4 at address 3'b011. The current read pointer RPTR may point at address 3'b000. The current write pointer WPTR may point at address 3'b100. The interval of the write pointer WPTR and the read pointer RPTR is four.

Figure 7:
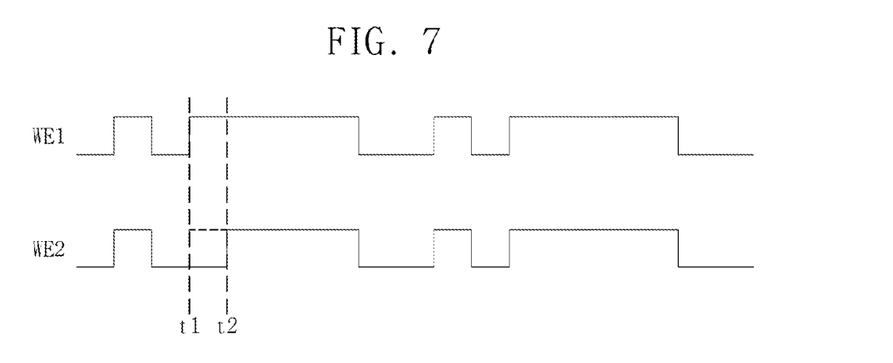
FIG. 7 is a timing diagram illustrating a write enable signal shown in FIGS. 4A and 4B.

FIG. 7 is a timing diagram illustrating a write enable signal shown in FIGS. 4A and 4B. Referring to FIGS. 4A, 4B and 7, a first write enable signal WE1 may include one of the slave write enable signal S_WE in FIG. 4A and the master write enable signal M_WE in FIG. 4B. When the compensation policy for a write pointer WPTR is performed, one of the slave write enable signal S_WE in FIG. 4A and the master write enable signal M_WE may be disabled for a clock cycle. For example, the first write enable signal WE1 may be in a state before performing the compensation and the second write enable signal WE2 may be in a state after performing the compensation. For example, the second write enable signal WE2 may be disabled from t1 to t2.

Figure 8:
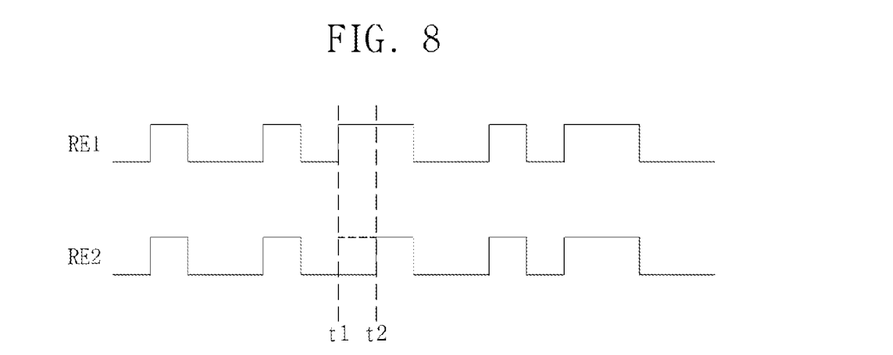
FIG. 8 is a timing diagram illustrating a read enable signal shown in FIGS. 4A and 4B.

FIG. 8 is a timing diagram illustrating a read enable signal shown in FIGS. 4A and 4B. Referring to FIGS. 4A, 4B and 8, a first read enable signal RE1 may include one of the master read enable signal M_RE in FIG. 4A and the slave read enable signal S_RE in FIG. 4B. When the compensation policy for a read pointer RPTR is performed, one of the master read enable signal M_RE in FIG. 4A and the slave read enable signal S_RE may be disabled for a clock cycle. For example, the first read enable signal RE1 may be in a state before performing the compensation and the second read enable signal RE2 may be in a state after performing the compensation. For example, the second read enable signal RE2 may be disabled from t1 to t2.

Figure 9:
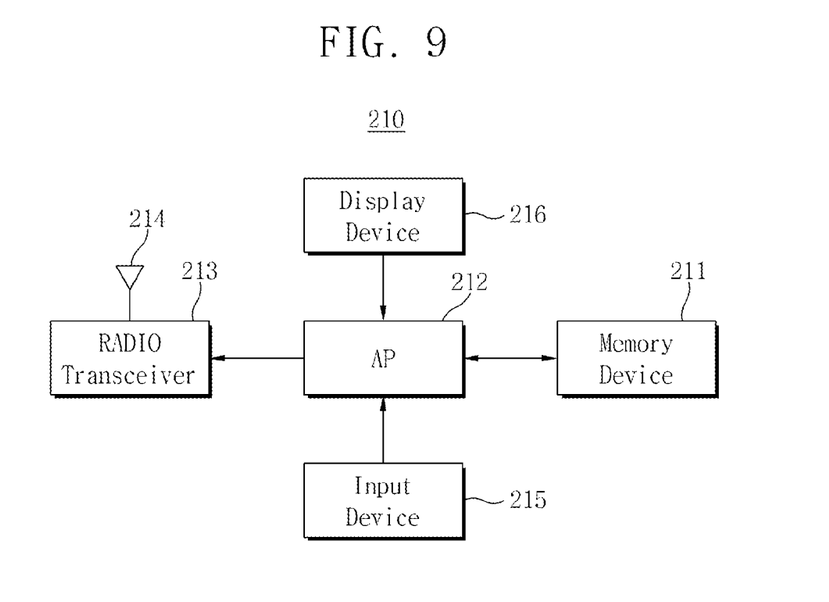
FIG. 9 is a block diagram of a computer system including an SoC according to an exemplary embodiment of the present inventive concept.

FIG. 9 is a block diagram of a computer system including an SoC according to an exemplary embodiment of the present inventive concept. Referring to FIG. 9, a computer system 210 may include a memory device 211, an application processor 212, a wireless transmitter-receiver 213, an antenna 214, a input device 215 and a display device 216.

The application processor 212 may include a memory and a memory controller to control the memory device.

The wireless transmitter-receiver 213 may transmit and receive a wireless signal through the antenna 214. The wireless transmitter-receiver 213 may convert the wireless signal received from the antenna 214 to a signal that can be processed by the application processor 212. The application processor 212 may process the signal received from the wireless transmitter-receiver 213 and may transmit the processed signal to the display device 216. The transmitter-receiver 213 may convert a signal received from the application processor 212 to a wireless signal and transmit the converted wireless signal to an external device.

The input device 215 may be a device that inputs a control signal to control an operation of the application processor 212 or inputs data to be processed by the application processor 212. For example, the input device 215 may be a touch pad, a pointing device such as a computer mouse, a keypad and a keyboard. According to an exemplary embodiment of the present inventive concept, the application processor 212 may include the SoC 1 shown in FIG. 1.

Figure 10:
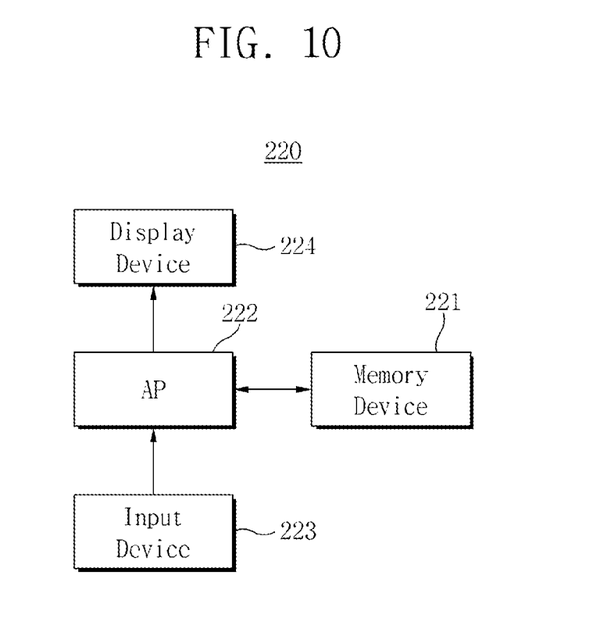
FIG. 10 is a block diagram of a computer system including an SoC according to another exemplary embodiment of the present inventive concept.

FIG. 10 is a block diagram of a computer system including an SoC according to another exemplary embodiment of the present inventive concept. Referring to FIG. 10, a computer system 220 may be embodied in a personal computer (PC), a network server, a tablet PC, a net-book, an e-reader, a personal digital assistant (PDA), a portable multimedia player (PMP), a MP3 player, a MP player, etc. The computer system 220 may include a memory device 221, an application processor 222, an input device 223 and a display device 224. The application processor 222 may include a memory and a memory controller to control the memory device.

The application processor 222 may transmit to the display device 224 data which is received from the input device 223 and stored in the memory device 221. The input device 223 may be a touch pad, a pointing device such as a computer mouse, a keypad, a keyboard and an image sensor. The application processor 222 may control an operation of the computer system 220 and a memory device 221. According to an exemplary embodiment of the present inventive concept, the application processor 212 may include the SoC 1 shown in FIG. 1.

Figure 11:
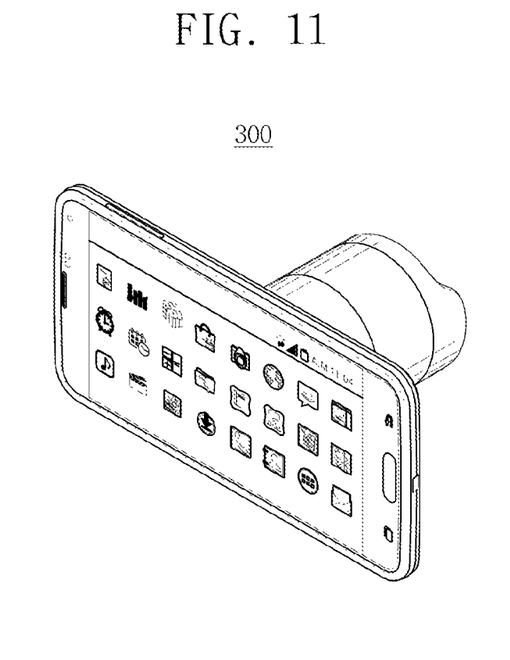
FIG. 11 is a perspective view of a digital camera including an SoC according to an exemplary embodiment of the present inventive concept.

FIG. 11 is a perspective view of a digital camera including an SoC according to an exemplary embodiment of the present inventive concept. Referring to FIG. 11, a digital camera device 300 may be a digital camera that operates based on an Android™ operating system, for example. According to an exemplary embodiment of the present inventive concept, the digital camera device 300 may include a Galaxy Camera™ and a Galaxy Camera2™.

The digital camera 300 may include a image sensor to capture a image or an video and an application processor to control the digital camera device 300. According to an exemplary embodiment of the present inventive concept, the application processor 212 may include the SoC 1 shown in FIG. 1.

Figure 12A:
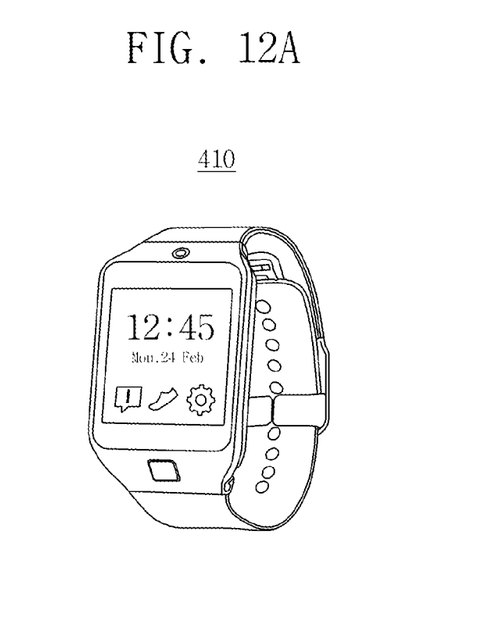
FIGS. 12A and 12B are perspective views of wearable devices including an SoC shown in FIG. 1.
Figure 12B:
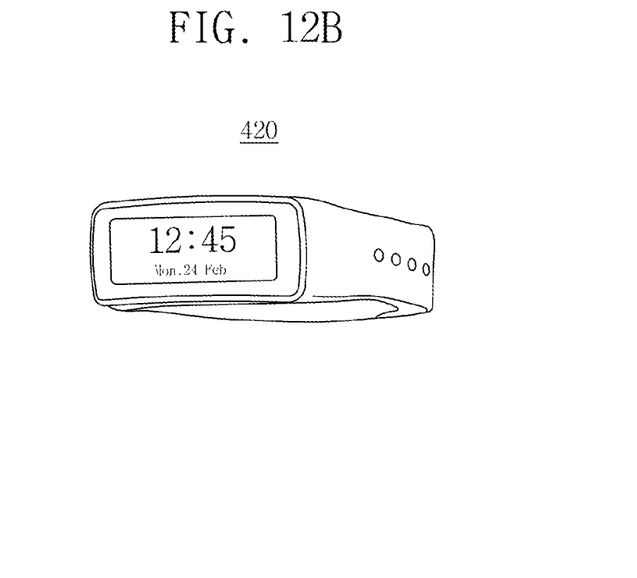

FIGS. 12A and 12B are perspective views of wearable devices including an SoC shown in FIG. 1. Referring to 12A and 12B, a first and a second wearable device 410 and 420 may be a wearable device which operates based on an android operating system or a TIZEN operating system. According to an exemplary embodiment of the present inventive concept, the first and the second wearable devices 410 and 420 may include a smart watch such as a Galaxy Gear2™ and a Galaxy Gear Fit™.

Each of the first and the second wearable devices 410 and 420 may include an application processor to operate an Android™ operating system or a TIZEN™ operating system, an image sensor to capture an image or a video and a display device to display the captured image or the captured video. According to an exemplary embodiment of the present inventive concept, the first and the second wearable devices 410 and 420 may include the SoC 1 shown in FIG. 1.

Figure 13:
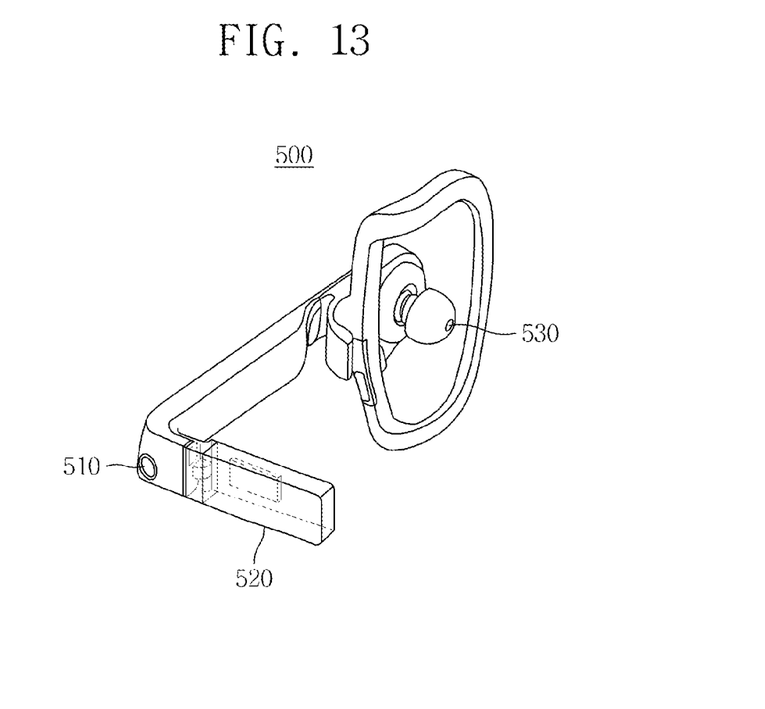
FIG. 13 is a perspective view of a wearable device including an SoC shown in FIG. 1.

FIG. 13 is a perspective view of a wearable device including an SoC shown in FIG. 1. Referring to FIG. 13, a wearable device 500 may operate based on an Android™ operating system or a TIZEN™ operating system. According to an exemplary embodiment of the present inventive concept, the wearable device 500 may include a Galaxy Blink™. The wearable devices 500 may include an application processor to operate an Android™ operating system or a TIZEN™ operating system, an image sensor to capture an image or a video and a display device to display the captured image or the captured video. According to an exemplary embodiment of the present inventive concept, the application processor may include the SoC 1 shown in FIG. 1. Although the present inventive concept has been described with reference to exemplary embodiments thereof, it will be understood by those of ordinary skill in the art that various changes in forms and details may be made thereto without departing from the spirit and scope of the present inventive concept as defined by the following claims.

What is claimed is:

1. A system-on-chip (SoC), comprising:
   a master;
   a slave; and
   an asynchronous interface having a first-in first-out (FIFO) memory connected to the master and the slave, wherein a write operation of the FIFO memory is controlled based on a comparison of a write pointer and an expected write pointer of the FIFO memory, and a read operation of the FIFO memory is controlled based on a comparison of a read pointer and an expected read pointer of the FIFO memory,
   wherein the asynchronous interface is configured to keep an interval between the read pointer and the write pointer constant, and wherein the expected read pointer is calculated based on the write pointer and the interval, and the expected write pointer is calculated based on the read pointer and the interval.

2. The system-on-chip of claim 1, wherein the FIFO memory comprises a first FIFO and a second FIFO, and the asynchronous interface comprises a slave interface and a master interface,
   wherein the slave interface comprises a slave transmitter, a slave receiver, and a slave clock domain crossing (CDC) block having the first FIFO, and
   wherein the master interface comprises a master transmitter, a master receiver, and a master clock domain crossing (CDC) block having the second FIFO connected to the master and the slave.

3. The system-on-chip of claim 1, wherein the asynchronous interface is configured to transmit data to the FIFO memory in synchronization with a gated clock generated based on a master operation clock and a slave operation clock.

4. The system-on-chip of claim 1, wherein a period of compensating an interval for the read operation of the FIFO memory is determined by a most significant bit (MSB) of the write pointer, and a period of compensating an interval for the write operation of the FIFO memory is determined by a most significant bit (MSB) of the write pointer.

5. The system-on-chip of claim 2, wherein the asynchronous interface is configured to generate a write enable signal to control the write operation of the FIFO memory based on a result of the comparison of the write pointer and the expected write pointer.

6. The system-on-chip of claim 2, wherein the asynchronous interface is configured to generate a read enable signal to control the read operation of the FIFO memory based on a result of the comparison of the read pointer and the expected read pointer.

7. The system-on-chip of claim 5, wherein the FIFO memory is configured to store data at an address pointed by the write pointer when the write enable signal is activated.

8. The system-on-chip of claim 6, wherein the FIFO memory is configured to transmit data stored at an address pointed by the read pointer to the master receiver or the slave receiver when the read enable signal is activated.

9. A method of operating a system-on-chip including a master, a slave and an asynchronous interface therebetween, the method comprising:
- calculating an expected write pointer based on a write pointer, and a predefined interval between the write pointer and a read pointer of a FIFO memory in the asynchronous interface;
- comparing the expected write pointer and the write pointer; and
- controlling a write operation of the FIFO memory based on a result of the comparing the expected write pointer and the write pointer.

10. The method of claim 9, wherein the FIFO memory comprises a first FIFO and a second FIFO, and the asynchronous interface comprises a slave interface and a master interface,
- wherein the slave interface comprises a slave transmitter, a slave receiver, and a slave clock domain crossing (CDC) block having the first FIFO, and
- the master interface comprises a master transmitter, a master receiver, and a master clock domain crossing (CDC) block having the second FIFO connected to the master and the slave.

11. The method of claim 10, further comprising:
- calculating an expected read pointer based on the read pointer and the predefined interval between the write pointer and the read pointer of the FIFO memory in the asynchronous interface;
- comparing the expected read pointer and the read pointer; and
- controlling a read operation of the FIFO memory based on a result of the comparing the expected read pointer and the read pointer.

12. The method of claim 10, wherein the controlling the write operation of the FIFO memory comprises:
- generating a write enable signal to control the write operation of the FIFO memory based on the result of the comparing the expected write pointer and the write pointer; and
- storing data at an address pointed by the write pointer when the write enable signal is activated.

13. The method of claim 11, wherein the controlling the read operation of the FIFO memory comprises:
- generating a read enable signal to control the read operation of the FIFO memory based on the result of the comparing the expected read pointer and the read pointer; and
- transmitting data stored at an address pointed by the read pointer to the master receiver or the slave receiver when the read enable signal is activated.

14. A method of operating a system-on-chip including a master, a slave and an asynchronous interface therebetween, the method comprising:
- calculating an expected write pointer based on a write pointer, and a predefined interval between the write pointer and a read pointer of a FIFO memory in the asynchronous interface;
- comparing the expected write pointer and the write pointer;
- controlling a write operation of the FIFO memory based on a result of the comparing the expected write pointer and the write pointer;
- calculating an expected read pointer based on the read pointer, and the predefined interval between the write pointer and the read pointer of the FIFO memory in the asynchronous interface;
- comparing the expected read pointer and the read pointer; and
- controlling a read operation of the FIFO memory based on a result of the comparing the expected read pointer and the read pointer.

15. The method of claim 14, wherein the controlling the write operation of the FIFO memory comprises:
- generating a write enable signal to control the write operation of the FIFO memory based on the result of the comparing the expected write pointer and the write pointer; and
- storing data at an address pointed by the write pointer when the write enable signal is activated.

16. The method of claim 14, wherein the controlling the read operation of the FIFO memory comprises:
- generating a read enable signal to control the read operation of the FIFO memory based on a result of the comparing the expected read pointer and the read pointer; and
- transmitting data stored at an address pointed by the read pointer to a receiver in the master or a receiver in the slave when the read enable signal is activated.

17. The method of claim 14, further comprising keeping the predefined interval between the read pointer and the write pointer constant.

18. The method of claim 14, wherein a period of compensating an interval for the read operation of the FIFO memory is determined by a most significant bit (MSB) of the write pointer, and a period of compensating an interval for the write operation of the FIFO memory is determined by a most significant bit (MSB) of the write pointer.

* * * * *